United States Patent

[15] 3,699,549
[45] Oct. 17, 1972

Bryzinski et al.

[54] FILAMENTARY MAGNETIC MEMORY WITH ELECTROSTATIC SHIELDING

[72] Inventors: Thaddeus F. Bryzinski, West Webster; Joseph F. Martin, Webster, both of N.Y.

[73] Assignee: Stromberg-Carlson Corporation, Rochester, N.Y.

[22] Filed: Nov. 4, 1968

[21] Appl. No.: 773,132

[52] U.S. Cl.....340/174 S, 340/174 PW, 340/174 NC
[51] Int. Cl.............................G11c 11/14, G11c 5/02
[58] Field of Search........................................340/174

[56] References Cited

UNITED STATES PATENTS

| | | | |
|---|---|---|---|
| 3,175,200 | 3/1965 | Hoffman et al. | 340/174 |
| 3,422,410 | 1/1969 | Bartik | 340/174 |
| 3,191,162 | 6/1965 | Davis | 340/174 |
| 3,479,655 | 11/1969 | Quinn | 340/174 |

*Primary Examiner*—Stanley M. Urynowicz, Jr.
*Attorney*—Charles C. Krawczyk

[57] ABSTRACT

A filamentary magnetic memory including an array of wires coated with a film of magnetic material about one micron thick. The wires lie in parallel array essentially in a single plane. Conductive strips extend normally across the wires on both sides, forming single turn loops around them. Thin sheets of non-magnetic, electrically conductive material are disposed between the conductive strips and the coated wires. The sheets constitute electrostatic shields, and are preferably arranged as narrow strips in register with the conductive strips. The sheets reduce the so-called common mode noise.

1 Claim, 4 Drawing Figures

PATENTED OCT 17 1972 3,699,549

INVENTOR
JOSEPH F. MARTIN
THADDEUS F. BRYZINSKI

BY Hoffman Stone
ATTORNEY

FILAMENTARY MAGNETIC MEMORY WITH ELECTROSTATIC SHIELDING

BRIEF SUMMARY

This invention relates to novel magnetic memories of the so-called plated wire type, and, more particularly, to novel memories of this type including means for reducing extraneous undesired signals of the kind referred to as common mode noise signals heretofore encountered in their operation.

The invention has application especially to magnetic memories of the kind described and claimed in the following copending applications, all filed Jan. 22, 1968, and assigned to the present assignee:

Ser. No. 699,672, entitled, "Filamentary Magnetic Memory and Method of Making It Using Flexible Sheet Material."

Ser. No. 699,673, entitled, "Filamentary Magnetic Memory and Methods of Making It Using Rigid Printed Circuit Cards."

Ser. No. 699,674, entitled, "Filamentary Magnetic Memory Including Word Straps Constituting More Than One Turn Around Each Magnetic Filament."

In general, magnetic memories of the type referred to are capable of non-destructive read-out. A typical memory of this type includes a parallel, planar array of closely spaced wires, called bit wires, each coated, typically by electroplating, with a film of magnetic material on the order of about one micron thick. The coating is magnetically anisotropic, and is more easily magnetized circumferentially than longitudinally of the wire. Bits of information are stored in fairly short incremental lengths of the coatings in the form of remanent magnetic flux, in one direction for a binary one, in the opposite direction for a zero. To read the memory, a momentary magnetic field is applied longitudinally of the wire, and the polarity of the e.m.f. induced in the coated wire during the rise or the decay of the applied field provides an indication of the angular direction of the flux, whether clockwise or counter clockwise around the wire. The longitudinal field skews the flux in the coating, producing a first momentary e.m.f. in the wire when the field is first applied. When the field decays, the flux in the coating rapidly reverts to its initial circumferential direction, producing another momentary e.m.f. Either of the momentary e.m.f.'s may be used to ascertain the polarity of the flux in the memory unit.

Information is written by maintaining a current through the coated wire in the appropriate direction during the decay of the longitudinal applied field. Regardless of the initial direction of magnetization, the flux then reverts to the circumferential direction conforming to the direction of the circumferential field produced by the current in the wire.

An important problem in the operation of memories of this kind is called common mode noise, which consists of signals induced in the coated wires by electrostatic coupling between them and the conductors, called word straps, which carry current around the wires to produce the longitudinal fields. The electrostatically induced signals are of relatively large values, and occur simultaneously with the signals of relatively small value produced by the magnetic action in the coatings. Heretofore, the problem of detecting the desired signals of relatively small value and distinguishing them from the common mode noise has been approached by the use of differential amplifiers and circuit arrangements by which the common mode signals were made to oppose and cancel each other, leaving the desired signals as net values to be detected by a sense amplifier. In general, good results have been achieved, but because of the very high speeds of the signals, the design of adequate circuit layouts is difficult. To insure cancellation, the opposed common mode signals must arrive simultaneously at the sense amplifier; a discrepancy of even a few nanoseconds may be enough to cause a false output signal.

Briefly, in accordance with the invention, the problem of common mode noise is greatly reduced by an arrangement of electrostatic shields between the word straps and the wires. The shields are electrically grounded, and effectively destroy the electrostatic coupling between the word straps and the bit wires. The shields are of non-magnetic material, and are arranged to minimize the production of eddy currents. They have only a minimum, easily tolerable, adverse effect on the magnetic coupling. When properly designed, the shields can reduce the common mode noise signals to very small values, and correspondingly reduce the difficulty of circuit design and the likelihood of false signals.

DETAILED DESCRIPTION

A representative embodiment of the invention will now be described in connection with the accompanying drawing, wherein.

Figure 1:
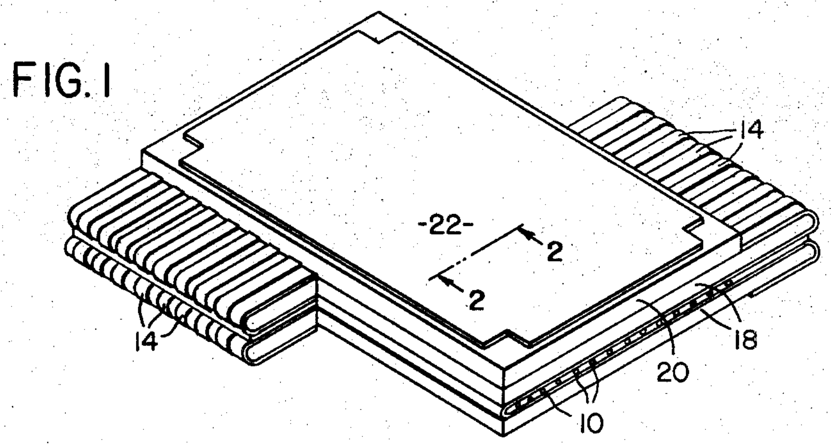
FIG. 1 is an isometric view, and partly in schematic form, illustrating a magnetic memory unit according to a presently preferred embodiment of the invention.

The construction and methods of making the magnetic memories in accordance with the invention may be generally similar to the arrangements and methods shown in the co-pending applications hereinabove referred to, and will be described only briefly herein. As shown in the drawing, the magnetic memory unit includes bit wires 10 arranged in parallel array in channels (not separately designated) between insulating lands 12. Word straps 14 overlie the bit wires 10 at right angles to them, and extend around both sides of the array to form single turn loops around the wires 10. Electrostatic shields 16, insulated both from the word straps 14 and from the bit wires 10, extend along the word straps 14 between them and the bit wires 10. The shields 16 are preferably wider than the word straps 14 for effectiveness against fringe fields, and, to avoid transformer coupling action with the word straps 14, each of the shields 16 is grounded at one point only, the rest of it being insulated.

The electrostatic shields 16 may be produced in any desired way such as, for example, by printed circuit etching techniques, or by evaporating successive layers of insulating and conductive materials through apertured masks upon a supporting base, which may also support the word straps 14. The shields 16 should be of a nonsmagnetic material of good electrical conductivity. Copper about 0.0005 inch thick is adequate in most cases. By making the shields 16 fairly thin and narrow, eddy currents are minimized, and there is only minimum interference with the magnetic coupling between the word straps 16 and the bit wires 10.

A sheet 18 of foil covers the entire unit, and constitutes a ground plane and electrostatic shield for protecting the unit from adverse effects due to operation of other equipment adjacent to it. The shields 16 are connected to the foil sheet 18 at only one point on each of the shields 16. The shields 16 do not constitute continuous loops of electrically conductive material extending around the array of bit wires 10. Each of the shields 16 with its associated word strap 14 constitutes a transformer, with the shield 16 being the secondary winding, and it is important that the secondary be open circuited, otherwise it would load its word strap 14 and adversely affect the magnetic coupling between the word straps 14 and the bit wires 10.

Figure 2:
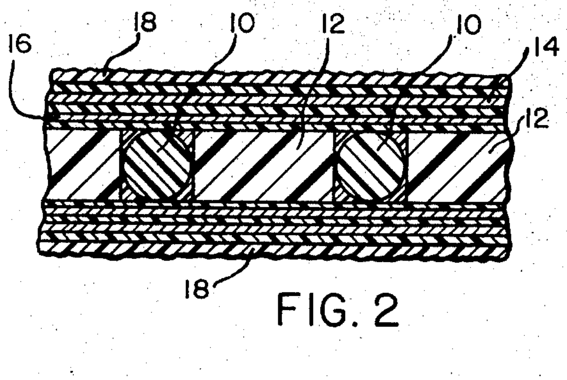
FIG. 2 is a cross-sectional view of the memory as shown in FIG. 1 taken along the line 2—2 of FIG. 1.
Figure 3:
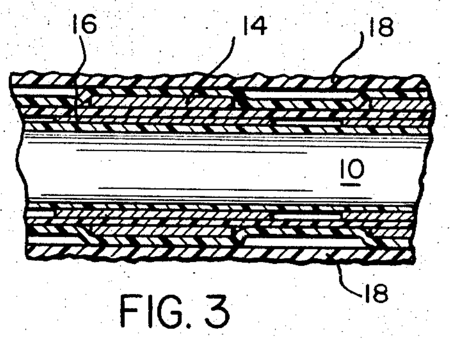
FIG. 3 is a longitudinal sectional view of the memory as shown in FIG. 1.
Figure 4:
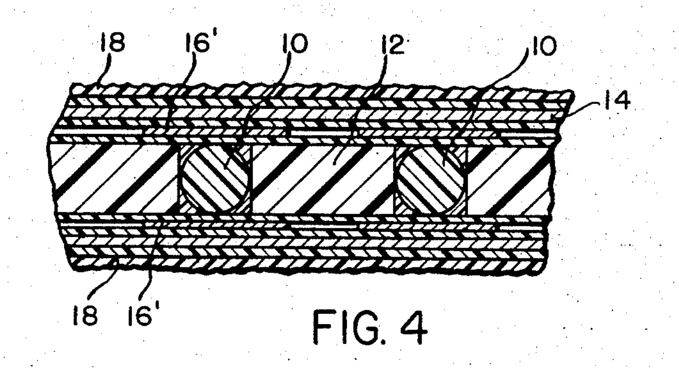
FIG. 4 is a cross-sectional view of a memory unit according to a modified form of the invention.

An alternative arrangement for the shields is shown in FIG. 4. In this case, the shields 16' extend along the respective bit wires 10, normal to the word straps 14. Otherwise the construction may be identical to the construction shown in FIGS. 1–3.

What is claimed is:

1. A filamentary magnetic memory device comprising:

a. A closely spaced parallel planar array of wires, each of said wires bearing a coating of magnetic material, b. electrically conductive straps normal to said wires and extending across both sides of said array, and c. a parallel planar array of electrostatic shielding elements disposed along opposite sides of said wires between and electrically insulated from said wires and said straps for electrostatically decoupling said wires from said straps, wherein said shielding elements are elongated strips extending parallel to and aligned with respective ones of said straps.

* * * * *